(12) United States Patent
Schott

(10) Patent No.: US 6,471,245 B1
(45) Date of Patent: Oct. 29, 2002

(54) BALLAST WEIGHT ARRANGEMENT

(75) Inventor: Herbert Schott, Marktoberdorf (DE)

(73) Assignee: AGCO GmbH & Co. (DE)

( * ) Notice: Subject to any disclaimer, the term of this patent is extended or adjusted under 35 U.S.C. 154(b) by 35 days.

(21) Appl. No.: 09/632,437

(22) Filed: Aug. 4, 2000

(30) Foreign Application Priority Data

Aug. 4, 1999 (GB) ............................................. 9918274

(51) Int. Cl.⁷ ................................................. B60S 9/00
(52) U.S. Cl. ..................................................... 280/759
(58) Field of Search ................................ 280/755, 758, 280/759; 212/178, 195

(56) References Cited

U.S. PATENT DOCUMENTS

| | | |
|---|---|---|
| 4,067,415 A | 1/1978 | Samide |
| 4,094,534 A * | 6/1978 | Welke et al. ............... 280/760 |
| 4,518,305 A * | 5/1985 | Stuhrmann .................. 414/719 |
| 4,781,516 A * | 11/1988 | Cripe et al. .................. 414/555 |
| 4,971,356 A * | 11/1990 | Cook .......................... 280/759 |
| 5,690,359 A * | 11/1997 | Teich .......................... 280/759 |
| 6,209,898 B1 * | 4/2001 | Fortier et al. ................ 280/187 |

FOREIGN PATENT DOCUMENTS

| | | |
|---|---|---|
| DE | 2059208 | 6/1972 |
| FR | 2561607 | 9/1985 |
| GB | 2067484 | 7/1981 |

* cited by examiner

Primary Examiner—Paul N. Dickson
Assistant Examiner—Faye M. Fleming
(74) Attorney, Agent, or Firm—MacMillan, Sobanski & Todd, LLC

(57) ABSTRACT

A ballast weight arrangement for a working vehicle has an interlocking connection between a ballast weight and a ballast weight support in the transverse plane of the vehicle, wherein interlocking is brought about by at least one projection on the ballast weight engaging in a recess on an adjacent ballast weight.

Interlocking is achieved by controlled movement of a locking member on lifting up ballast weight 8 from a deposit block 22 and be released on putting down ballast weight 8 on deposit block 22.

12 Claims, 7 Drawing Sheets

BALLAST WEIGHT ARRANGEMENT

FIELD OF THE INVENTION

The invention relates to a ballast weight arrangement for working vehicles, in particular agricultural tractors.

BACKGROUND TO THE INVENTION

In the case of working vehicles, such as agricultural tractors, demand is increasingly directed to larger and larger units, with which correspondingly large and powerful working equipment can be used. However, the ballast weights which are arranged on a ballast weight support on the vehicle in order to compensate for the weight also increase along with the weight of this type of working equipment. If it is assumed that the total weight for ballasting is 1700 kg, then, even with 22 individual ballast weights, each ballast weight weighs 80 kg. Apart from the fact that handling such a large number of ballast weights is very time consuming, these types of heavy ballast weights cannot be handled by the vehicle driver without assistance.

DE-AS 20 59 208 discloses a device for connecting ballast weights which cannot be handled by an individual person to a farming tractor. Each ballast weight is provided on the face nearer the vehicle with a trapezoid recess and on the other face with a trapezoid projection. Several ballast weights can be combined to give an integrated ballast weight by latching the recess in each ballast weight over the projection of the adjacent ballast weight which is nearer to the vehicle and thus holding it in place. A deposited ballast weight is lifted up by means of a reversed triangular frame which can be raised and lowered and inserted from below into the recess in the ballast weight nearest the vehicle by a lifting device on the tractor itself. The individual ballast weights are thus reliably protected from unintentional loosening in all directions, but rapid driving over uneven ground can lead to relative movement of the ballast weights with respect to each other which can be detected due to rattling noises and/or vibrations. In addition, there is the possibility that the ballast weights may separate from each other in the event of the tractor overturning.

DE-AS 16 80 649 describes an added weight for farming tractors which is also supported by the adjacent added weight which is nearer to the vehicle and is provided with supporting lugs and projections which engage in corresponding recesses in the adjacent added weight. This type of added weight is fixed to and interlocked in all directions against the supporting added weight and therefore no relative movement between the weight and its support occurs when driving rapidly over uneven ground. However, this added weight may separate from its support in the event of the tractor overturning.

SUMMARY OF THE INVENTION

The invention provides a ballast weight arrangement for a vehicle, the arrangement comprising a ballast weight support member and a ballast weight, the support member and ballast weight each comprising attachment means arranged to co-operate with one another to attach the ballast weight to the support member, characterized in that the arrangement further comprises locking means comprising a locking member and an actuating element, wherein movement of the actuating element moves or permits movement of the locking member between a locked position in which the ballast weight is secured to the support member and unlocked position in which the ballast weight may be removed from the support member.

Preferably, the actuating element is slidably mounted in the ballast weight and projects downwardly therefrom, and wherein placing the ballast weight on a deposit block moves the actuating element from the locked position to the unlocked position.

Biasing means to bias the locking member into the locked position may be provided. Biasing means to bias the actuating element into a position which permits the locking member to move into the locked position may be provided. The biasing means may comprise a spring, which spring may be a coil spring.

Preferably, the locking member or the actuating element shall comprise a slanting face, or more preferably both shall comprise a slanting face.

Preferably, the wherein the locking member and the actuating element are mounted in guides arranged so that the paths along which the locking member and actuating element move intersect. More preferably, the locking member guide is substantially horizontal and the actuating element guide is substantially vertical.

The actuating element may comprise a recess in which at least a portion of the locking member is located.

The arrangement may comprise a first support member securable to the vehicle, and a plurality of ballast weights, wherein at least one of said ballast weights comprises a support member thereby permitting adjacent ballast weights to be attached one to another.

As a result, the object of the invention is to create a ballast weight which can be attached and removed easily and which is reliably retained on its support in all situations.

The invention ensures that interlocking between neighbouring ballast weights which prevents any relative movement is created, without the intervention of an operator, occurs as soon as the group of ballast weights is lifted from the deposit block. This means that ballast weights can be lifted onto the ballast support individually or in groups of several ballast weights, or ballast weights which are no longer required can be removed from the ballast weight support individually or in groups, without the vehicle driver having to leave his driving seat.

The ballast weight arrangement of the invention allows ballast weights to be added and removed from a vehicle safely and simply. The arrangement ensures that the ballast weights are secured in place when attached to the vehicle, even in the even of the vehicle rolling over.

BRIEF DESCRIPTION OF THE DRAWINGS

In the drawings, which show an exemplary embodiment of a ballast weight arrangement according to the invention:

FIGS. 1 and 2 show the front region of a working vehicle which is provided with a hydropneumatic, level-regulated spring system for the steering type axle 2 supporting the front wheels 1. This type of axle spring system is disclosed, for example, in EP 0 616 870 B 1 and enables the position of the vehicle chassis 3 relative to the ground to be altered within pre-set limits. Since the invention does not relate to the axle spring system itself, but simply makes use of the level-regulating system provided, as one of several known possibilities for lifting up and putting down super-heavy ballast weights, the axle spring system is not dealt with in any more detail at this point. The steering type axle 2 is mounted on a longitudinal control arm 4 so that it can oscillate about a (not shown) axis running in the longitudinal direction along the middle of the vehicle, which again is linked further back to the vehicle chassis so that it can swing on bearings 5.

Figure 1:
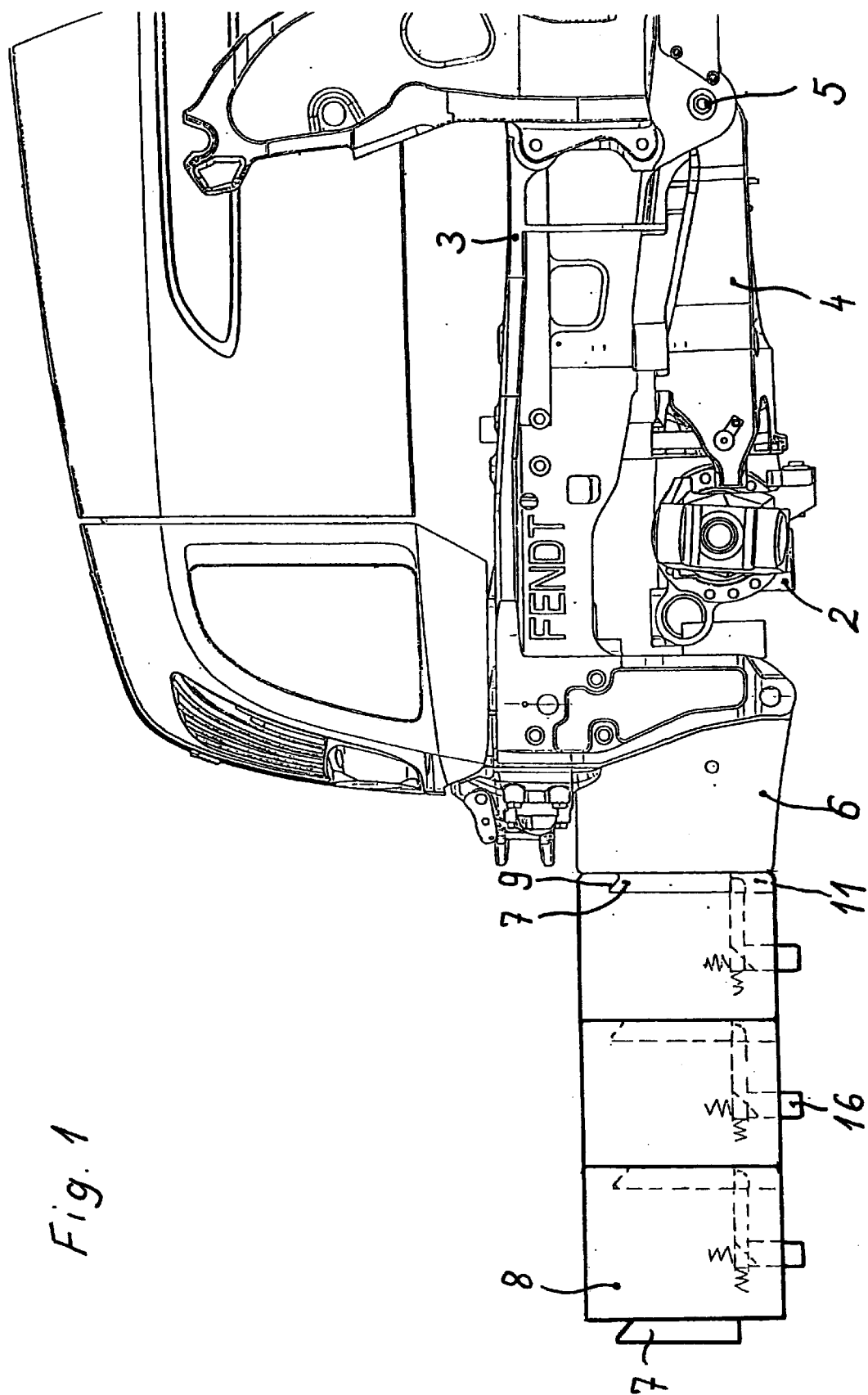
FIG. 1 a side view of the front region of a working vehicle.
Figure 2:
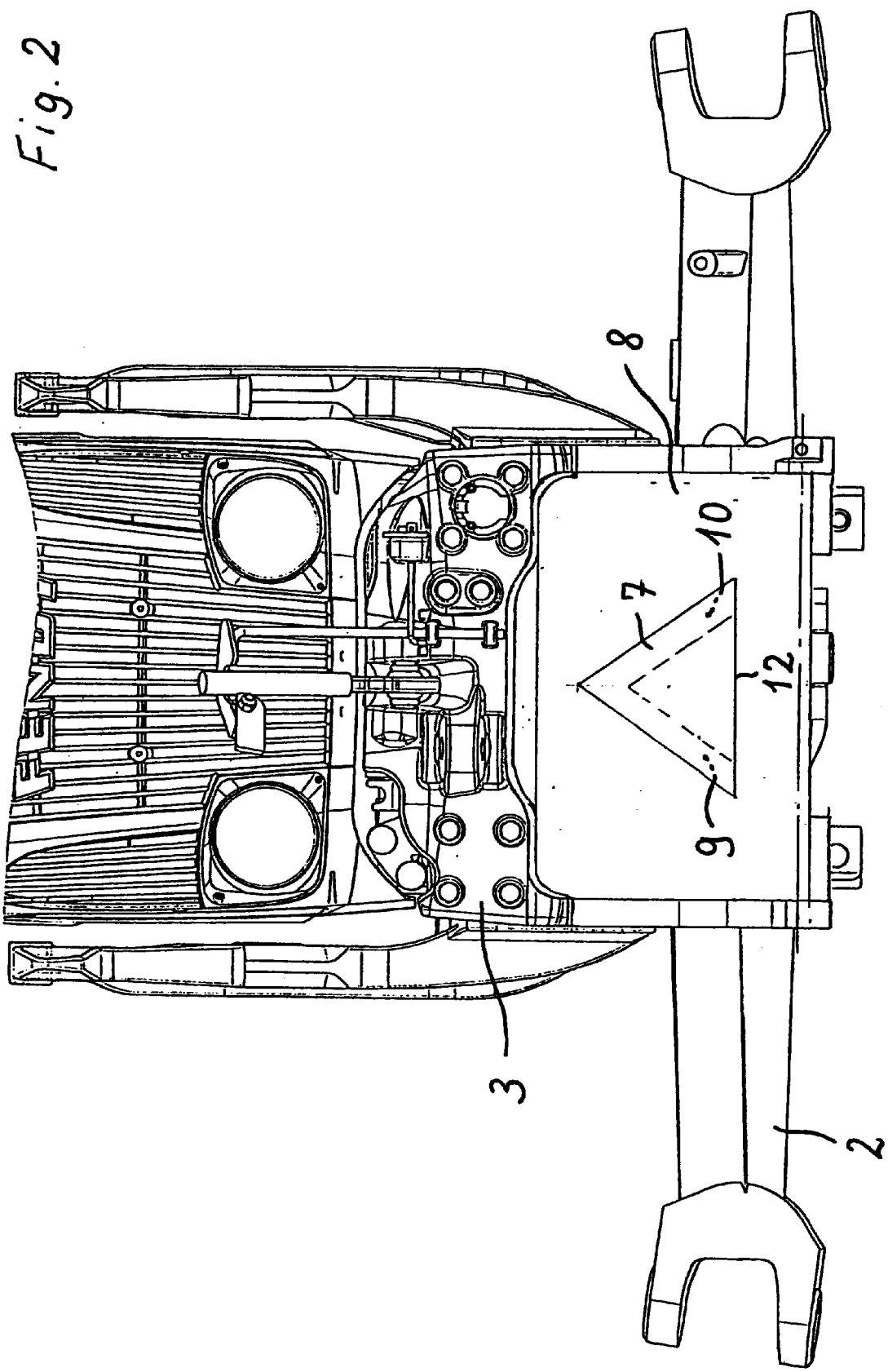
FIG. 2 a view of the front face of the working vehicle in accordance with FIG. 1, FIG. 3 a ballast weight picked up by a ballast weight support with locking brought into action in order to produce interlocking between these parts, FIG. 4 a deposited ballast weight, in which locking in accordance with FIG. 3 is inactive, FIG. 5 an exploded view in perspective of the locking element in accordance with FIGS. 3 and 4, FIGS. 6 to 10, the front region of a working vehicle and a ballast weight in various phases of the loading and unloading procedure, FIGS. 11 to 13, the front region of a working vehicle and several ballast weights in various phases of the loading and unloading procedure.

On the front face of vehicle chassis 3 is fastened a ballast weight support 6, by means of (not shown) fastening agents, the end face of which projects forwards and carries a triangular pick-up plate 7 known per se with a point which projects upwards for picking up ballast weight 8. The pick-up plate 7 forms a truncated pyramid with side faces 9 which project laterally from the point and the small base face fits closely onto the front end face of ballast weight support 6. Horizontal face 10 which faces the ground forms a ledge on ballast weight support 6 which projects at right angles to the end face, which, as described below, is used to produce complete interlocking between the ballast weight support 6 and a ballast weight 8. In the same way as ballast weight support 6, all the ballast weights are provided with a pick-up plate 7.

In addition, all ballast weights 8 are provided with a triangular recess 11 on the end face which faces backwards. The size and shape of this match those of pick-up plate 7, wherein in particular the edge faces 12 are designed to be complementary to edge faces 9 on pick-up plate 7. Each ballast weight 8 is suspended in such a way on its support, whether it be the ballast weight support 6 firmly fixed to the vehicle or the adjacent ballast weight 8 nearer to the vehicle, that it can be removed from this simply by a vertical upwards movement but is immovably connected in all other directions. Thus, each ballast weight 8, with the exception of the weight furthest from the vehicle, simultaneously acts as a ballast weight support, also called a support 6, 8 in the following.

In order to prevent ballast weight 8 shifting with respect to support 6 if the vehicle overturns or as a result of vibrations which occur during use of the vehicle, with the risk that a ballast weight may be dislodged from support 6, 8, each ballast weight 8 has a locking device which prevents this type of movement. The locking device is designed so that it is effective without any special action having to be performed by the vehicle driver, when ballast weight 8 is fully held in place by its support 6, 8. Conversely, the locking device is ineffective in the case of ballast weights 8 which have been unloaded, also without any special action having to be performed by the vehicle driver.

The locking device consists of a plate-shaped locking member 13 which can be displaced from a locking position to an unlocked position in a horizontal guide 14 in ballast weight 8 against the force of an elastic element 15. Guide 14 starts at the end face of ballast weight 6 in which recess 11 is provided and is located at a height which enables locking member 13 to engage with pick-up plate 7 on ballast weight support 6, 8 with a small degree of play, in the locking position.

Figure 3:
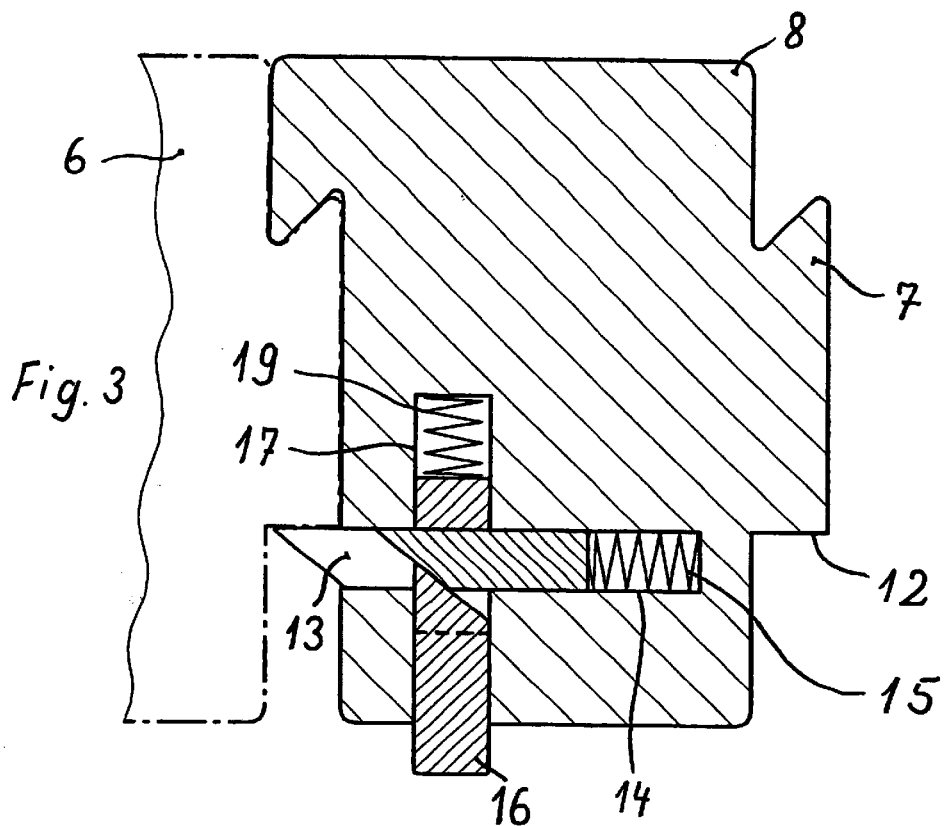
Figure 4:
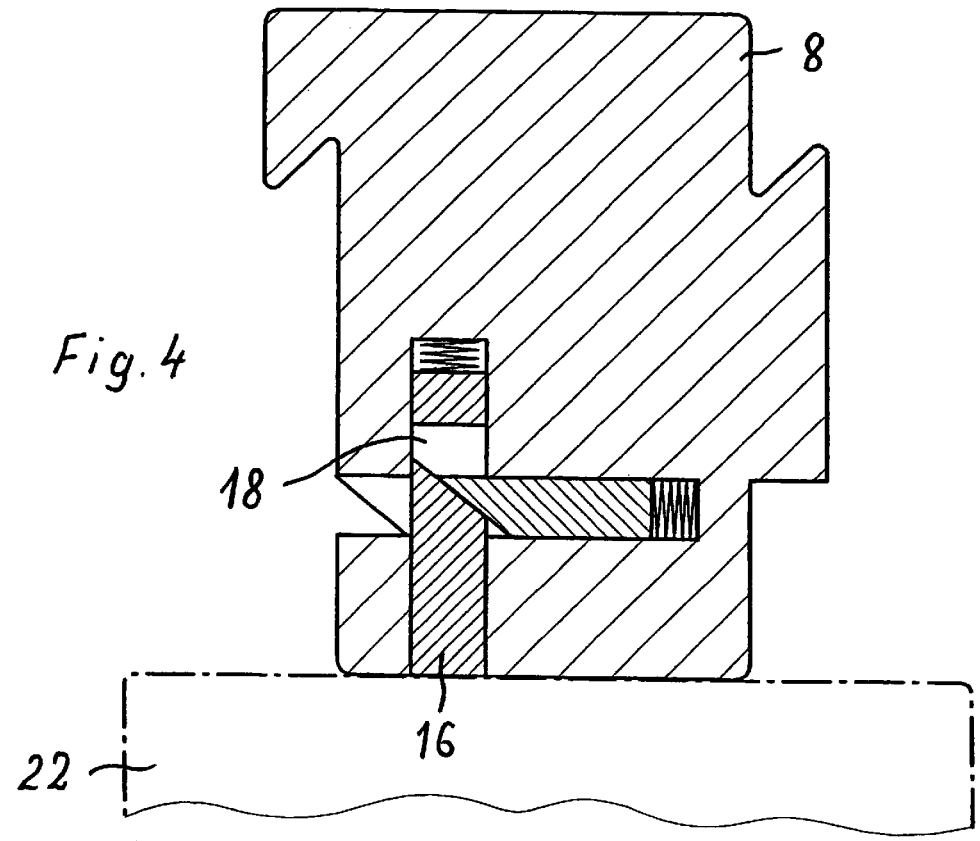
Figure 5:
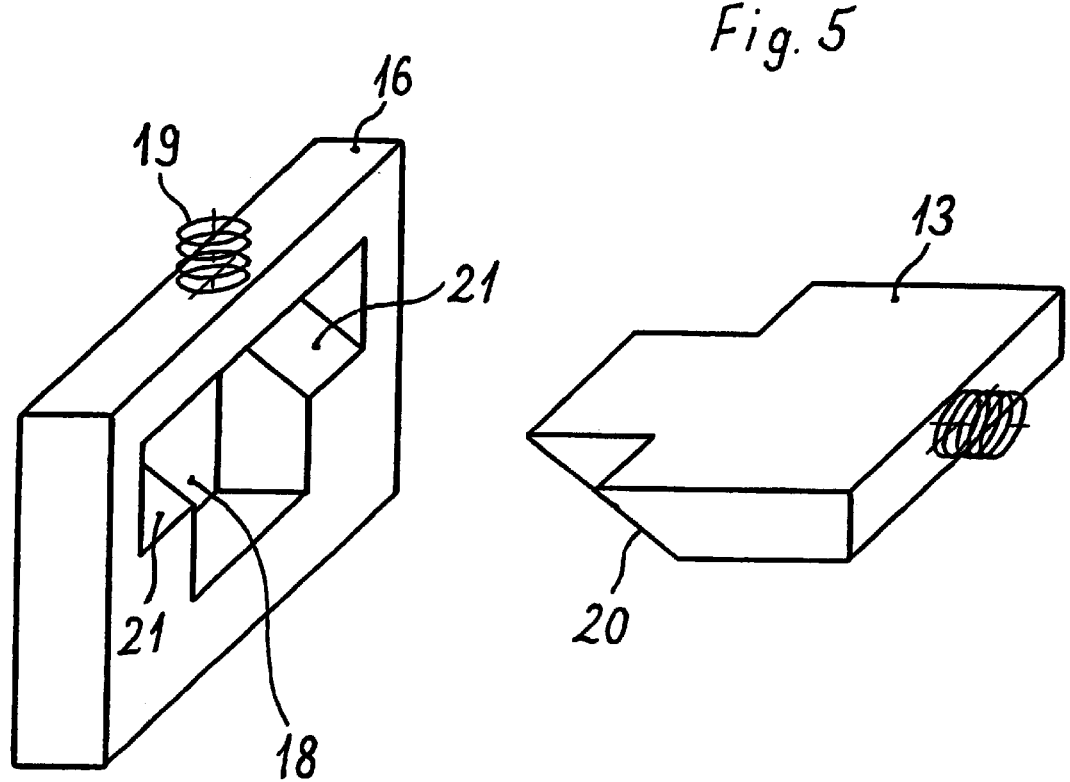

According to FIGS. 3 to 5, displacing locking member 13 takes place using an actuating element 16 which is also plate-shaped, and which can be displaced in a vertical direction in guide 17, which starts at the lower face of ballast weight 8 and intersects with horizontal guide 14, between a lower position, in which locking member 13 is effective, and an upper position, in which the locking member is ineffective. Since the guides intersect, actuating element 16 has a recess 18 by means of which locking member 13 is fixed in place. In its lower position, actuating element 16 projects a certain distance beyond the contour of ballast weight 8, wherein locking member 13 latches into take-up plate 7 of ballast weight support 6 with a small degree of play. In its upper position, actuating element 16 is withdrawn fully inside the contour of ballast weight 8 against the force of an elastic element 19, wherein locking member 13 is fully withdrawn from the region of pick-up plate 7, within guide 17. The desired dependence of the motion of locking member 13 on that of actuating element 16 is achieved by slanting faces 20, 21 on locking element 13 and actuating element 16 which run at 45° to guides 14, 17 and work together.

Figure 6:
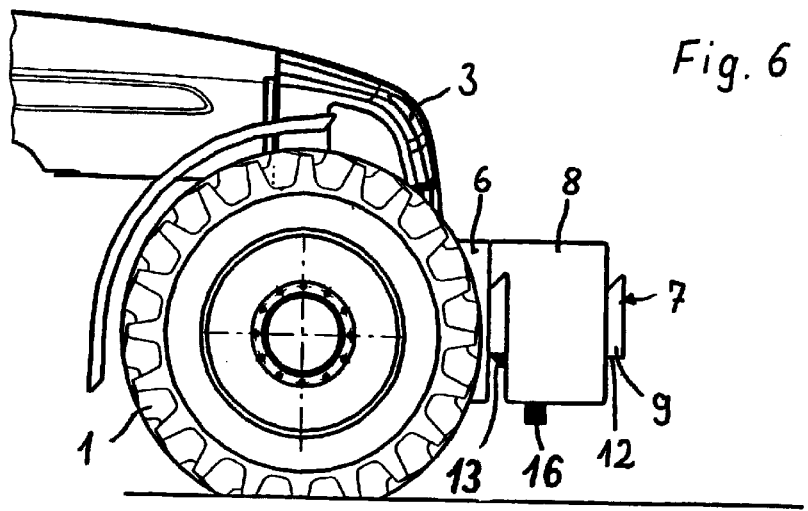

FIG. 6 shows a working vehicle with only one ballast weight 8 suspended on its ballast weight support 6. The height of vehicle chassis 3 and thus the height of ballast weight 8 above the ground is adjusted by means of the level regulating system in the working vehicle to a value dependent on the intended mode of operation, wherein the axle spring system is generally blocked. As can be seen, the actuating element 16 projects downwards out of the ballast weight 8 and the locking member 13 latches onto the pick-up plate 7 on the ballast weight support 6, so that ballast weight 8 is securely held in all directions.

Figure 7:
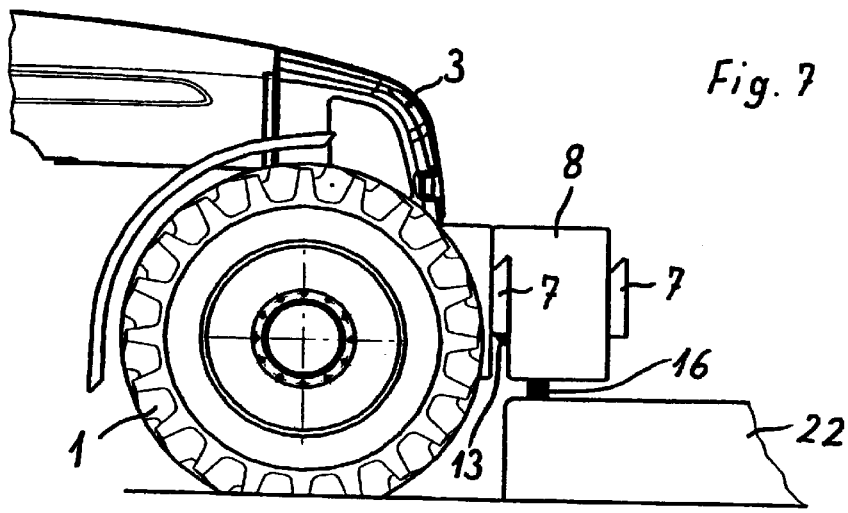
Figure 8:
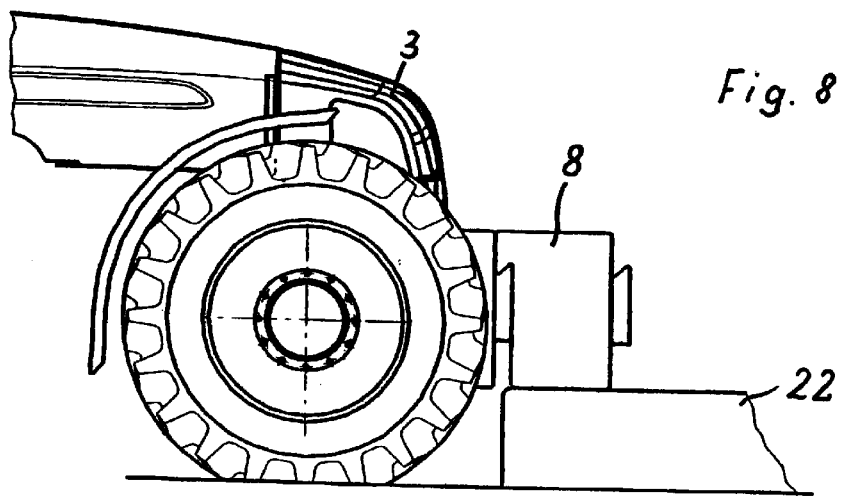
Figure 9:
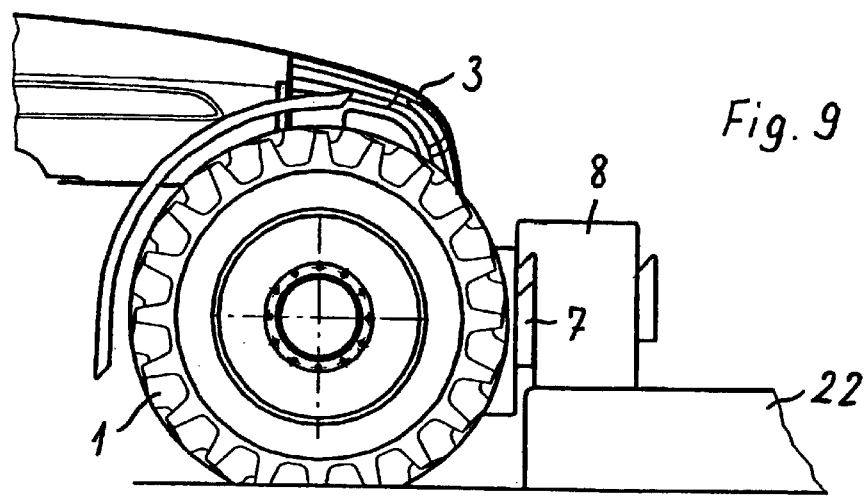

Unloading of the ballast weight from the working vehicle is described below, using FIGS. 7 to 10:

FIG. 7 shows the working vehicle with its vehicle chassis 3 raised to the highest possible point, by means of the vehicle's own level-regulation device, in order to initiate unloading and ballast weight 8 is driven to above a stable deposit block 22. Deposit block 22 is so low that the actuating element 16 projecting from below the ballast weight 8 does not make contact with the deposit block 22 in this unloading phase. The ballast weight 8 is lowered right at the edge of deposit block 22 so that ballast weight support 6 has sufficient room to drop down at a later unloading phase. First of all, however, in accordance with FIG. 8, ballast weight 8 is lowered onto deposit block 22. This means that actuating element 16 and locking member 13 are pushed back into guides 14, 17 against the force of elastic elements 15, 19 due to the actual weight of ballast weight 8, which is how the lock on ballast weight 8 is released without any special manipulation on the part of the vehicle driver. As can be seen on FIG. 9, the recess 11 on ballast weight 8 can then be disengaged from pick-up plate 7 by further lowering vehicle chassis 3 and the working vehicle, as shown in FIG. 10, can be separated from ballast weight 8 by reversing.

Figure 10:
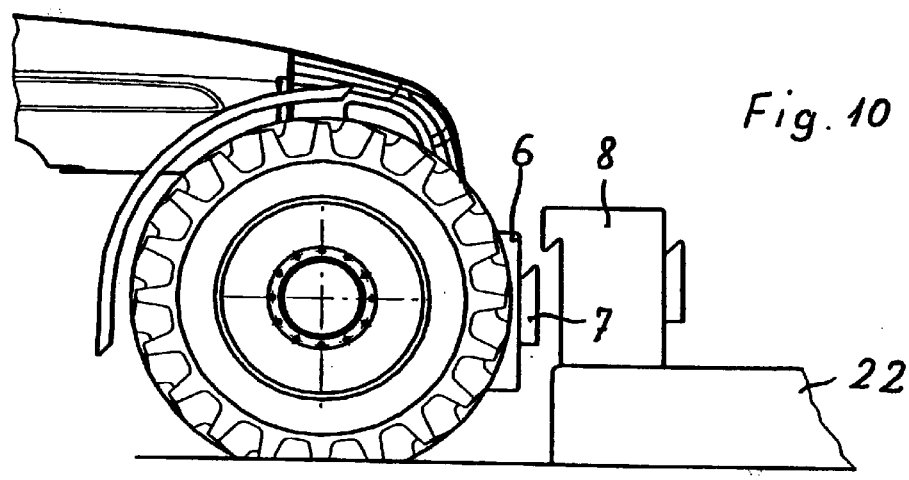

Picking up a ballast weight takes place in the same manner, but in the reverse sequence, going from FIG. 10 to FIG. 6.

When fitting the working vehicle with several ballast weights 8, loading and unloading takes place in basically the same way as when fitting only one ballast weight 8.

Figure 11:
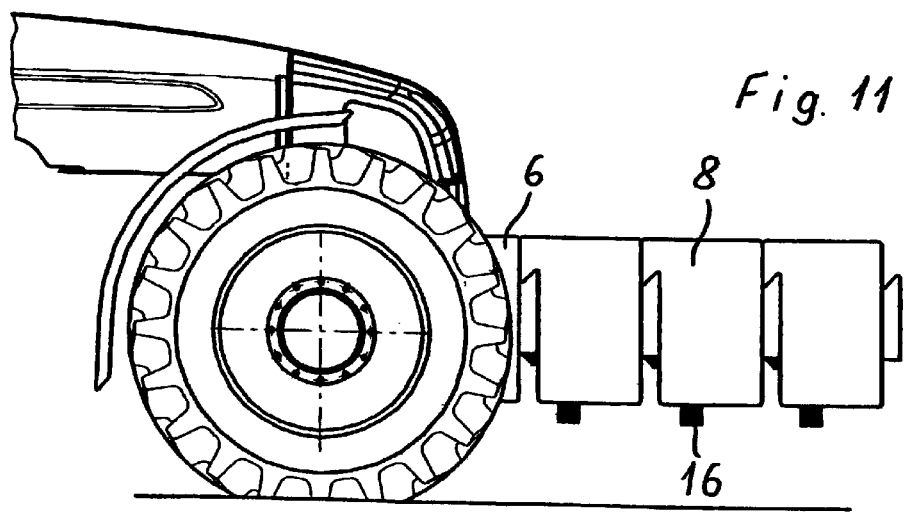
Figure 12:
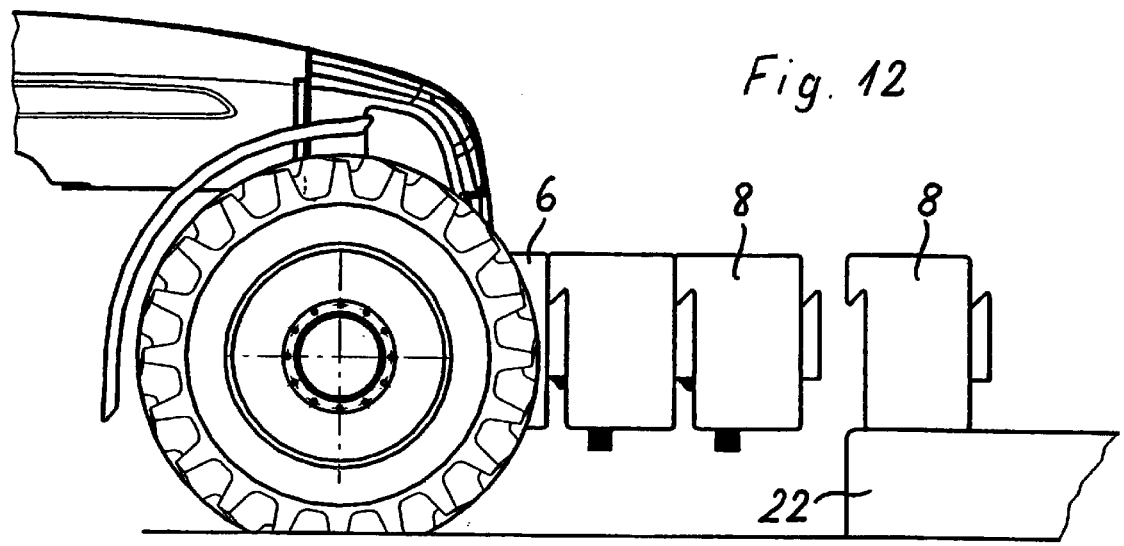
Figure 13:
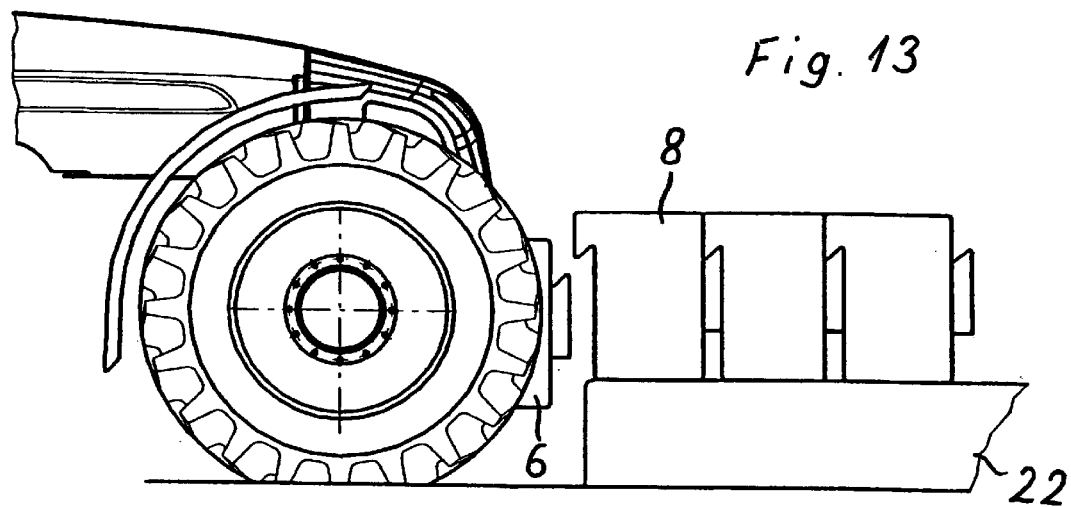

FIG. 11 shows a working vehicle with three ballast weights 8 carried on its ballast weight support 6. If not all of the ballast weights, but only a certain number of these are to be unloaded, than only the ballast weights to be unloaded are driven over deposit block 22 and lowered thereon to, as shown in FIGS. 12 and 13.

What is claimed is:

1. A ballast weight arrangement for a vehicle comprising:
   a ballast weight support member and a ballast weight, said support member and said ballast weight arranged to co-operate with one another to attach said ballast weight to said support member, and
   a locking member and an actuating element movably mounted in said ballast weight, wherein movement of said actuating element causes movement of said locking member between a locked position, in which said ballast weight is secured to said support member, and an unlocked position, in which said ballast weight may be removed from said support member.

2. An arrangement according to claim 1, wherein said actuating element is slidably mounted in said ballast weight and projects downwardly therefrom, and wherein placing said ballast weight on a deposit block moves said actuating element upwardly, thereby moving said locking member from said locked position to said unlocked position.

3. An arrangement according to claim 1, further comprising biasing means to bias said locking member into said locked position.

4. An arrangement according to claim 1, further comprising biasing means to bias the actuating element into a position which permits said locking member to move into the locked position.

5. An arrangement according to claim 3, wherein said biasing means comprise a spring, which spring may be a coil spring.

6. An arrangement according to claim 4, wherein said biasing means comprises a spring, which may be a coil spring.

7. An arrangement according to claim 1, wherein the locking member comprises a slanting face.

8. An arrangement according to claim 1, wherein said actuating element comprises a slanting face.

9. An arrangement according to claim 1, wherein said locking member and said actuating element are mounted in guides arranged so that the paths along which said locking member and said actuating element move intersect.

10. An arrangement according to claim 1, wherein said locking member guide is substantially horizontal and said actuating element guide is substantially vertical.

11. An arrangement according to claim 1, wherein said actuating element comprises a recess in which at least a portion of said locking member is located.

12. An arrangement according to claim 1, comprising a first support member securable to the vehicle, and a plurality of ballast weights, wherein at least one of said ballast weights comprises a support member thereby permitting adjacent ballast weights to be attached one to another.

* * * * *